(12) United States Patent
Jones et al.

(10) Patent No.: US 6,211,633 B1
(45) Date of Patent: Apr. 3, 2001

(54) SYNCHRONOUS SAMPLING CIRCUIT FOR A SENSORLESS SWITCHING RELUCTANCE MACHINE SYSTEM

(75) Inventors: Stephen R. Jones, Winnebago; Barry T. Drager, Rockford, both of IL (US)

(73) Assignee: Hamilton Sundstrand Corporation, Rockford, IL (US)

( * ) Notice: Subject to any disclaimer, the term of this patent is extended or adjusted under 35 U.S.C. 154(b) by 0 days.

(21) Appl. No.: 08/680,582

(22) Filed: Jul. 10, 1996

(51) Int. Cl.$^7$ .................................................. H02D 7/06
(52) U.S. Cl. ........................ 318/254; 318/138; 318/439; 318/560; 318/567
(58) Field of Search ................................ 318/560–567, 318/254, 439, 138

(56) References Cited

U.S. PATENT DOCUMENTS

| | | | |
|---|---|---|---|
| 4,331,924 | 5/1982 | Elliott et al. | 377/47 |
| 4,374,351 | 2/1983 | Fishman et al. | 318/600 |
| 4,455,513 | 6/1984 | Fulton et al. | 318/138 |
| 4,553,078 | 11/1985 | Wise | 318/594 |
| 4,611,157 | 9/1986 | Miller et al. | 318/696 |
| 4,642,543 | 2/1987 | MacMinn | 318/696 |
| 4,772,839 | 9/1988 | MacMinn et al. | 318/696 |
| 4,825,055 * | 4/1989 | Pollock | 235/411 |
| 4,959,596 | 9/1990 | MacMinn et al. | 318/254 |
| 4,959,823 | 9/1990 | Getreuer et al. | 369/44.13 |
| 5,007,007 | 4/1991 | van Zanten et al. | 364/574 |
| 5,097,190 * | 3/1992 | Lyons et al. | 318/701 |
| 5,105,137 * | 4/1992 | Iijima | 318/568.22 |
| 5,107,195 | 4/1992 | Lyons et al. | 318/701 |
| 5,115,180 * | 5/1992 | Chung | 318/618 |
| 5,140,243 | 8/1992 | Lyons et al. | 318/701 |

(List continued on next page.)

FOREIGN PATENT DOCUMENTS

| | | |
|---|---|---|
| 276625 | 8/1988 | (EP) . |
| 401818 | 12/1990 | (EP) . |
| WO 94 11945 | 5/1994 | (WO) . |

OTHER PUBLICATIONS

Reynolds et al, "Robust Estimation of Covariance Matrices", IEEE Transactions on Automatic Control, Sep. 9, 1990.

N.M. Mvungi et al., "Sensorless Rotor Position in an SR Motor", European Conference on Power Electronics and Application, Sep. 3–6, 1991.

Ertugrul et al., "Real–Time Estimation of Rotor Position in PM Motors During Transient Operation", The European Power Electronics Association, 1993.

Jones et al., "Performance of a High Speed Switched Reluctance Starter/Generator System Using Electronic Position Sensing", Record of the Industry Applications Conference, Oct. 8–12, 1995.

Ramoni et al., "New Communication Methods in Switched Reluctance Motors Based on Active Phase Vectors", Proceedings of the Annual Power Electronics Specialists Conference, Jun. 20–24, 1994.

(List continued on next page.)

Primary Examiner—Robert E. Nappi
Assistant Examiner—Tyrone Smith
(74) Attorney, Agent, or Firm—Ryan M. Fountain

(57) ABSTRACT

Apparatus for detecting an operating condition of a machine synchronizes sampling instants with the machine condition so that high reliability data are obtained. More particularly, an indication of the operating condition of a rotor of the machine is developed at each sampling instant. The operating condition may be, for example, the position of the rotor, in which case estimates of the rotor position and rotor velocity at each of the sampling instants are developed. Sampling signals are then derived from the rotor position and velocity estimates to synchronize the sampling instants to the rotor position.

2 Claims, 5 Drawing Sheets

U.S. PATENT DOCUMENTS

| | | | |
|---|---|---|---|
| 5,140,244 | | 8/1992 | Lyons et al. ............ 318/701 |
| 5,144,564 | | 9/1992 | Naido et al. ............ 364/494 |
| 5,159,254 | * | 10/1992 | Teshima ................ 318/611 |
| 5,165,051 | | 11/1992 | Kumar .................. 324/79 |
| 5,173,650 | | 12/1992 | Heglund ................ 318/701 |
| 5,196,775 | | 3/1993 | Harris et al. ............ 318/560 |
| 5,248,921 | * | 9/1993 | Kato et al. ............ 318/560 |
| 5,291,115 | | 3/1994 | Ehsani .................. 318/701 |
| 5,296,785 | | 3/1994 | Miller .................. 318/254 |
| 5,296,794 | | 3/1994 | Lang et al. ............ 318/715 |
| 5,323,309 | * | 6/1994 | Taylor et al. ............ 364/184 |
| 5,325,026 | | 6/1994 | Lyons et al. ............ 318/254 |
| 5,332,955 | | 7/1994 | Hopper ................ 318/632 |
| 5,381,081 | | 1/1995 | Radun .................. 318/701 |
| 5,394,323 | | 2/1995 | Yellowley et al. ........ 364/167 |
| 5,404,091 | | 4/1995 | Radun et al. ............ 318/701 |
| 5,448,149 | | 9/1995 | Ehsani et al. ............ 318/701 |
| 5,467,025 | | 11/1995 | Ray .................... 324/772 |
| 5,488,531 | | 1/1996 | Aldridge et al. .......... 363/56 |
| 5,491,622 | | 2/1996 | Carosa .................. 363/56 |
| 5,493,195 | | 2/1996 | Heglund et al. .......... 318/701 |
| 5,499,186 | | 3/1996 | Carosa .................. 363/56 |
| 5,525,886 | | 6/1996 | Lyons .................. 318/701 |
| 5,627,444 | | 5/1997 | Fulks .................. 318/701 |
| 5,637,974 | | 6/1997 | McCann ................ 318/701 |
| 5,874,818 | * | 2/1999 | Schuurman ............ 318/439 |

OTHER PUBLICATIONS

Panda et al., "Further Developments in Indirect–Rotor Position Sensing of Variable–Reluctance Motors Using Wave Form Detection Technique", Power Electronics, Nov. 15–19, 1993.

Caileux et al., "Effect of the Sampling and the Phase Communication in Nonlinear Position Control of a Switched Reluctance Motor–Analysis and Compensation", Proceedings of the $32^{nd}$ Conference on Design and Control, Dec. 1993.

*Design and Implementation of a Five Horsepower, Switched Reluctance, Fuel–Lube, Pump Motor Drive for a Gas Turbine Engine* Written by Caio A. Ferreira, Stephen R. Jones, Barry T. Draper and William S. Heglund, IEEE Ninth Annual Applied Power Electronics Conference and Exposition, Feb. 13–17, 1994.

*Practical Indirect Position Sensing for a Variable Reluctance Motor* written by Walter D. Harris and submitted to the Massachusetts Institute of Technology, May 1987.

*A Simple Motion Estimator for Variable–Reluctance Motors*, written by Walter D. Harris and Jeffrey H. Lang, published in IEEE, vol. 26, No. 2. Mar./Apr. 1990.

*Low Cost Sensorless Switched Reluctance Motor Drives For Automotive Applications* written by M. Ehsani and I. Husain, (member IEEE) Power Electronics Laboratory, Dept. Of Electrical Engineering, Texas A&M University, College Station, TX. pp. 96–101.

*Application of Sensor Integration Techniques to Switched Reluctance Motor Drives* written by Stephen R. MacMinn, William J. Rzesos, Paul M. Szczesny and Thomas M. Jahns, published in IEEE vol. 28, No. 6, Nov./Dec. 1992.

*New Modulation Encoding Techniques for Indirect Rotor Position Sensing in Switched Reluctance Motors*, written by Mehrdad Ehsani, Iqbal Husain, S. Mahajan, and K.R. Ramani, published in IEEE, vol. 30, No. 1, Jan./Feb. 1994.

*Flux/Current Methods for SRM Rotor Position Estimation*, written by J.P. Lyons, S.R. MacMinn and M.A. Preston, published in May 1991 IEEE.

* cited by examiner

SYNCHRONOUS SAMPLING CIRCUIT FOR A SENSORLESS SWITCHING RELUCTANCE MACHINE SYSTEM

BACKGROUND AND SUMMARY OF THE INVENTION

The present invention relates generally to motors/generators and, more particularly, to high speed switched reluctance machines capable of starting a prime mover as well as generating electrical power for use on aircraft.

The aerospace industry has consistently driven the leading edge of technology with the requirement for lightweight, high efficiency, high reliability equipment. The equipment must be lightweight because each additional pound of weight translates directly into increased fuel burn, and therefore, a higher cost of ownership and shorter range. The need for high efficiency results from the fact that each additional cubic inch required for equipment displaces the amount of revenue-generating cargo and passengers that can be carried on an aircraft. High reliability is important because every minute of delay at the gate increases the cost of ownership, and likewise, increases passenger frustration.

Aircraft have typically used synchronous brushless AC generators or permanent magnet generators for electric power generation needs.

In addition to an electrical generator, an engine starter is also typically installed on the aircraft engine. This component is used only during starting, which occupies only a very small fraction of each operational cycle of the aircraft. In effect, the starter becomes excess baggage during the remainder of the flight, increasing overall weight, fuel burn, and cost of ownership, and decreasing overall range. This problem has been recognized and efforts have been expended to combine the starter and generator into a single package, thus eliminating the need for an additional piece of equipment used only a fraction of the time.

As an alternative to the use of the synchronous AC or the permanent magnet generator for this combined starter/generator function, a switched reluctance machine can be used. A switched reluctance machine is an inherently low cost machine, having a simple construction which is capable of very high speed operation, thus yielding a more lightweight design. The rotor of the switched reluctance machine is constructed from a simple stack of laminations making it very rugged and low cost without the containment problems associated with rotor windings or permanent magnets. Further, the rotor does not require rotating rectifiers, which contribute to failures, as does the AC synchronous machine.

In order to properly operate a switched reluctance machine, it is necessary to determine the rotor position in order to properly commutate the currents flowing in the phase windings of the machine. Resolvers are used, particularly in high speed systems, or sometimes encoders in low speed systems, to obtain a measure of rotor position. However, resolvers and required associated apparatus (chiefly, a resolver-to-digital converter and an excitation circuit) are expensive and both resolvers and encoders are a source of single point failure.

In order to obviate the need for position sensors, such as resolvers or encoders, sensorless operational techniques have been developed. The most trivial solution to sensorless operation is to control the switched reluctance machine as a stepper motor in the fashion disclosed in Bass, et al. U.S. Pat. No. 4,611,157 and MacMinn U.S. Pat. No. 4,642,543. In an alternative technique, machine inductance or reluctance is detected and utilized to estimate rotor position. Specifically, because the phase inductance of a switched reluctance machine varies as a function of angle from alignment of the stator pole for that phase and a rotor pole, a measurement of instantaneous phase inductance can be utilized to derive an estimate of rotor position. See MacMinn, et al. U.S. Pat. No. 4,772,839, MacMinn, et al. U.S. Pat. No. 4,959,596, Harris "Practical Indirect Position Sensing for a Variable Reluctance Motor," Masters of Science Thesis, MIT, May 1987, Harris, et al. "A Simple Motion Estimator for Variable Reluctance Motors," IEEE Transactions on Industrial Applications, Vol 26, No. 2, March/April, 1990, and MacMinn, et al. "Application of Sensor Integration Techniques to Switched Reluctance Motor Drives," IEEE Transactions on Industry Applications, Vol. 18, No. 6, November/December, 1992.

In a further technique, phase inductance can be determined using a frequency modulation approach whereby a non-torque producing phase forms part of a frequency modulation encoder. See Ehsani, et al. "Low Cost Sensorless Switched Reluctance Motor Drives for Automotive Applications," Texas A&M Power Electronics Laboratory Report (date unknown), Ehsani, et al. "An Analysis of the Error in Indirect Rotor Position Sensing of Switched Reluctance Motors," IEEE Proceedings IECON '91, Ehsani "A Comparative Analysis of SRM Discrete Shaft Position Sensor Elimination by FM Encoder and Pulsed Impedance Sensing Schemes," Texas A&M Power Electronics Laboratory Report, (date unknown) and Ehsani, et al. "New Modulation Encoding Techniques for Indirect Rotor Position Sensing in Switched Reluctance Motors," IEEE Transactions on Industry Applications, Vol. 30, No. 1, January/February, 1994.

A model-based approach to rotor position estimation has been developed by General Electric Company and is disclosed in Lyons, et al. "Flux/Current Methods for SRM Rotor Position Estimation," Proceedings of IEEE Industry Applications Society Annual Meeting, Vol. 1, 1991, and Lyons, et al. U.S. Pat. No. 5,097,190. In this technique, a multi-phase lumped parameter model of the switched reluctance machine is developed and utilized.

A position estimation subsystem for a sensorless switched reluctance machine control has been developed by the assignee of the instant application and includes a relative angle estimation circuit, an angle combination circuit and an estimator including a Kalman filter. The relative angle estimation logic is responsive to sampled phase current magnitudes of the switched reluctance machine and develops an angle estimate for each phase. The angle combination logic combines the phase angle estimates to obtain an absolute angle estimate which eliminates ambiguities that would otherwise be present. The estimator utilizes a model of the switched reluctance machine system as well as the absolute angle measurement to form a better estimate of the rotor position and velocity and, if necessary or desirable for other purposes, the rotor acceleration. An instantaneous position generation circuit converts the output of the Kalman filter to a signal that can properly control commutation.

An object of the present invention is to provide an apparatus for acquiring data representing a machine operating condition.

It is further an object to provide an apparatus which obtains high reliability data concerning machine operation.

Yet another object is to obtain data for a sensorless switched machine control and, more particularly, to obtain high reliability data for the relative angle estimation logic described above.

It is a still further object to obtain high reliability data using circuitry which is simple, reliable and low in cost.

These and other objects and advantages are attained by a circuit which synchronizes sampling instants to machine rotor position and/or velocity. Specifically, synchronization circuitry is responsive to rotor position and velocity estimates and develops a sampling signal which controls sampling of machine phase current magnitudes.

The apparatus of the present invention is effective to obtain data representing machine rotor position in a fashion which enhances the reliability of such data.

These and other objects, advantages and novel features of the present invention will become apparent to those skilled in the art from the drawings and following detailed description.

DESCRIPTION OF THE PREFERRED EMBODIMENTS

Figure 1:
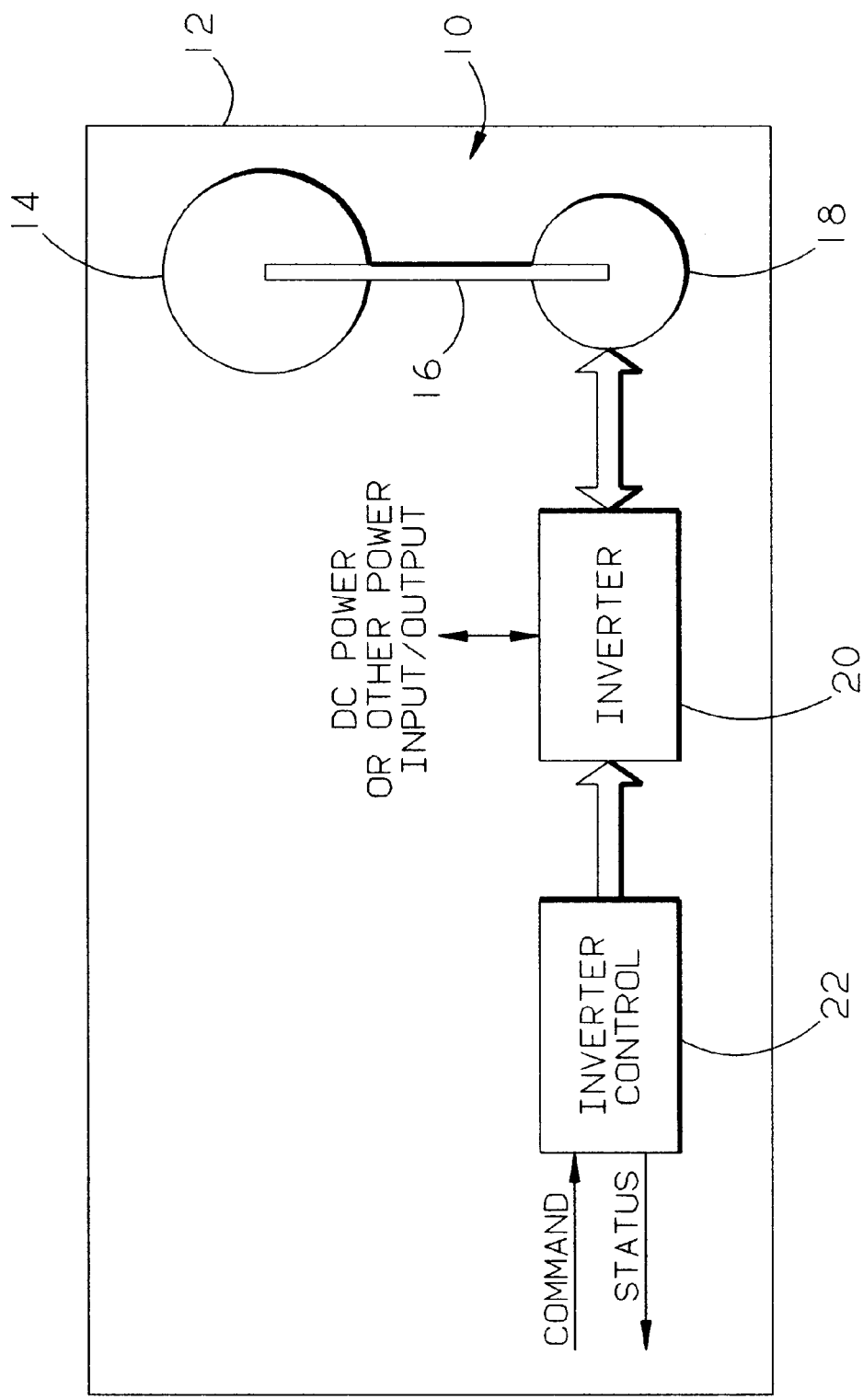
FIG. 1 comprises a block diagram of a starting/generating system for an aircraft.

Referring first to FIG. 1, a power conversion system 10 is provided on-board an aircraft (shown diagrammatically at 12) or other aerospace, land or water vehicle and includes a prime mover, for example, a gas turbine engine 14, which is coupled by a motive power shaft 16 to a switched reluctance machine 18. The machine 18 includes phase windings which are coupled to an inverter 20 operated by an inverter control 22. In a starting mode of operation, DC power is supplied to the inverter 20 and the inverter control 22 develops control signals for switches in the inverter 20 to cause the switched reluctance machine 18 to operate as a motor and supply motive power via the shaft 16 to the gas turbine engine 14 for starting purposes. During operation in a generating mode, motive power is supplied by the gas turbine engine to the switched reluctance machine 18 via the shaft 16 and the resulting electrical power developed by the switched reluctance machine 18 is converted by the inverter 20 into DC power for one or more loads. If necessary or desirable, the inverter 20 could be modified to develop constant-frequency AC power for one or more AC loads.

Figure 2:
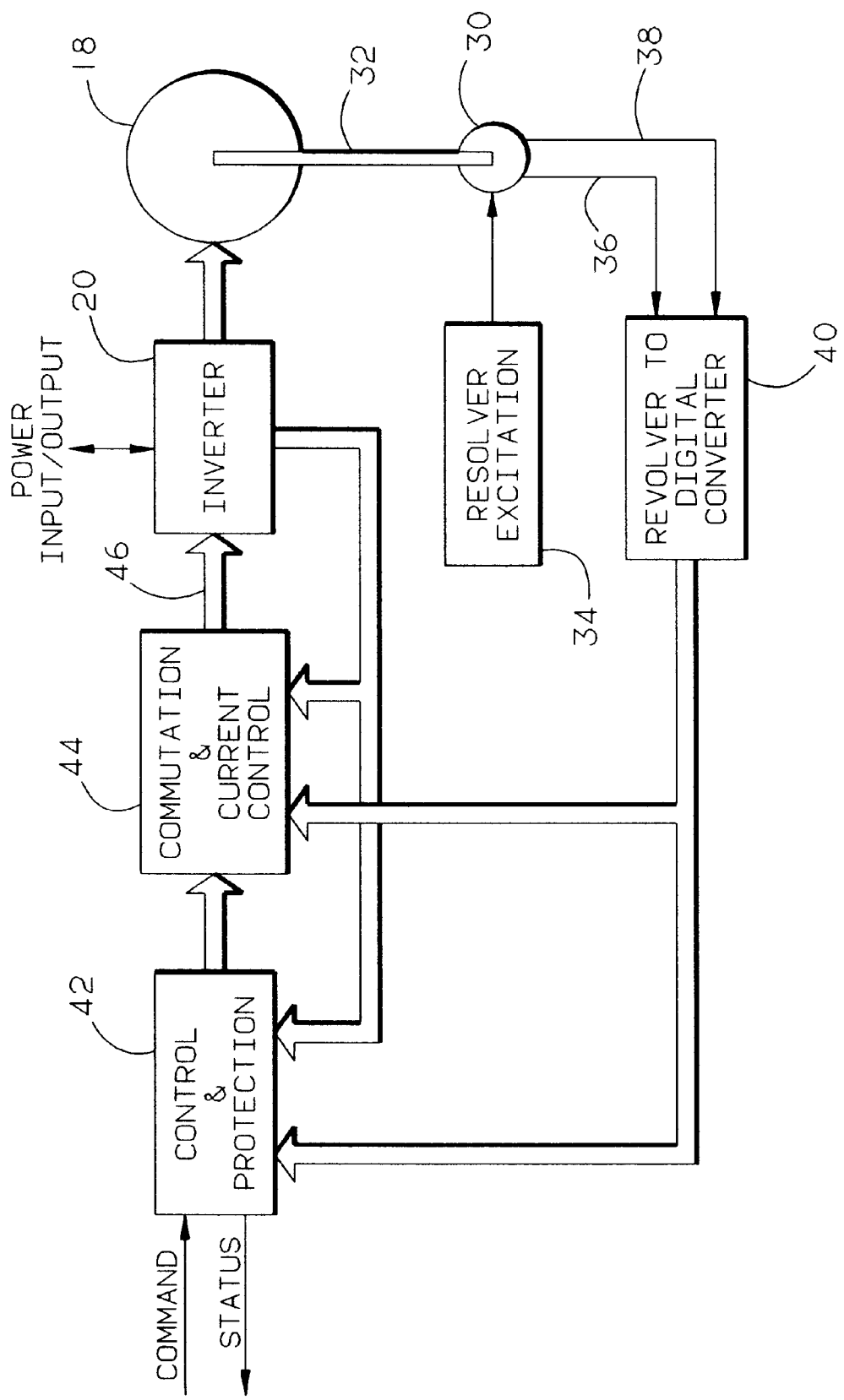
FIG. 2 comprises a block diagram of a prior art inverter control, inverter and switched reluctance machine.

Referring now to FIG. 2, a prior art inverter control for operating the switched reluctance machine 18 includes a resolver 30, which is coupled by a motive power shaft 32 to the rotor of the switched reluctance machine 18. Excitation is provided by a resolver excitation circuit 34. The resolver 30 develops first and second signals over lines 36, 38 that have a phase quadrature relationship (also referred to as sine and cosine signals). A resolver-to-digital converter 40 is responsive to the magnitudes of the signals on the lines 36 and 38 and develops a digital output representing the position of the rotor of the switched reluctance machine 18. The position signals are supplied along with a signal representing machine rotor velocity to a control and protection circuit 42. The rotor position signals are also supplied to a commutation and current control circuit 44 having an input coupled to an output of the control and protection circuit 42.

The circuits 42 and 44 further receive phase current magnitude signals as developed by the inverter 20. The circuits 42 and 44 develop switch drive signals on lines 46 for the inverter 20 so that the phase currents flowing in the windings of the switched reluctance machine 18 are properly commutated.

As noted previously, the resolver 30 is expensive and inherently a source of single point failure. Further, the resolver-to-digital converter 40 is also an expensive component and, hence, it is desirable to eliminate these and other components (including the excitation circuit 34), if possible.

Figure 3:
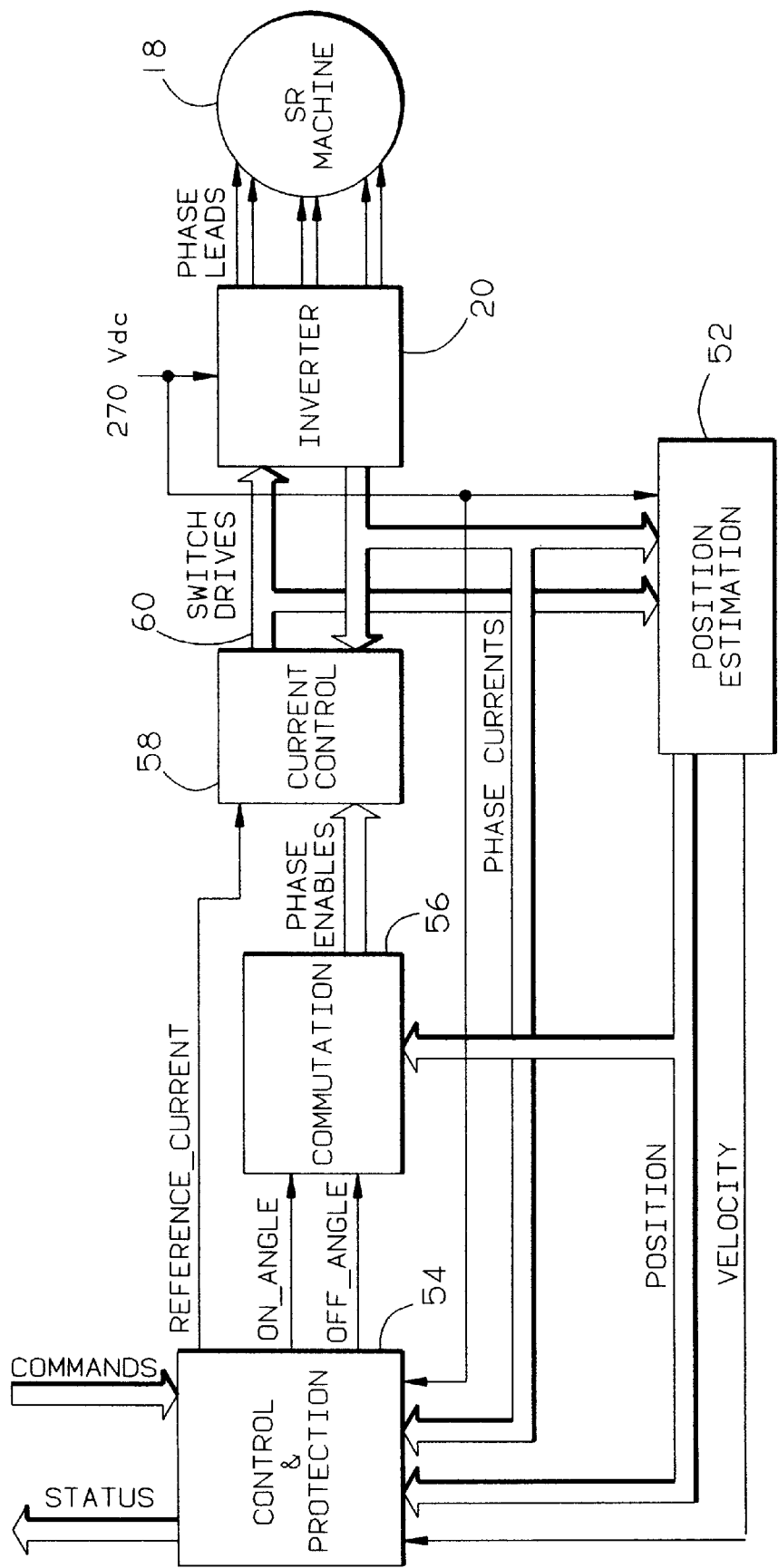
FIG. 3 comprises a block diagram of an inverter control incorporating the present invention together with an inverter and a switched reluctance machine.

FIG. 3 illustrates an inverter control 50 that incorporates the present invention together with the inverter 20 and the switched reluctance machine 18. A position estimation circuit or subsystem 52 is responsive to the phase current magnitudes developed by the inverter 20, switch control or drive signals for switches in the inverter 20 and DC bus voltage magnitude to develop position and velocity estimate signals for a control and protection circuit 54. In addition, the position estimate signals are supplied to a commutation circuit 56. A current control circuit 58 is responsive to the phase current magnitudes developed by the inverter 20, as well as phase enable output signals developed by the commutation circuit 56 and a reference current signal developed by the control and protection circuit 54. The current control circuit 58 produces the switch control or drive signals on lines 60 for the inverter 20.

In order for the position estimation subsystem to operate properly, data representing operation of the machine 18 must be reliably obtained. From sampling theory, it is known that at least two samples must be taken, and subsequent calculations performed, during each electrical cycle so that aliasing effects are avoided. The minimum sampling rate $R_{min}$ is thus:

$$R_{min} = 2(S_{rotor})N_p$$

where $S_{rotor}$ is the speed of the machine rotor in revolutions per second and $N_p$ is the number of rotor poles of the machine 18. Generally, any sampling scheme must sample at a rate substantially greater than $R_{min}$ to insure that at least some samples are obtained at or near optimum sampling instants. The optimum point at which to obtain a sample from a phase is typically at or near 90 electrical degrees from alignment of a rotor pole with a stator pole for that phase.

Figure 4:
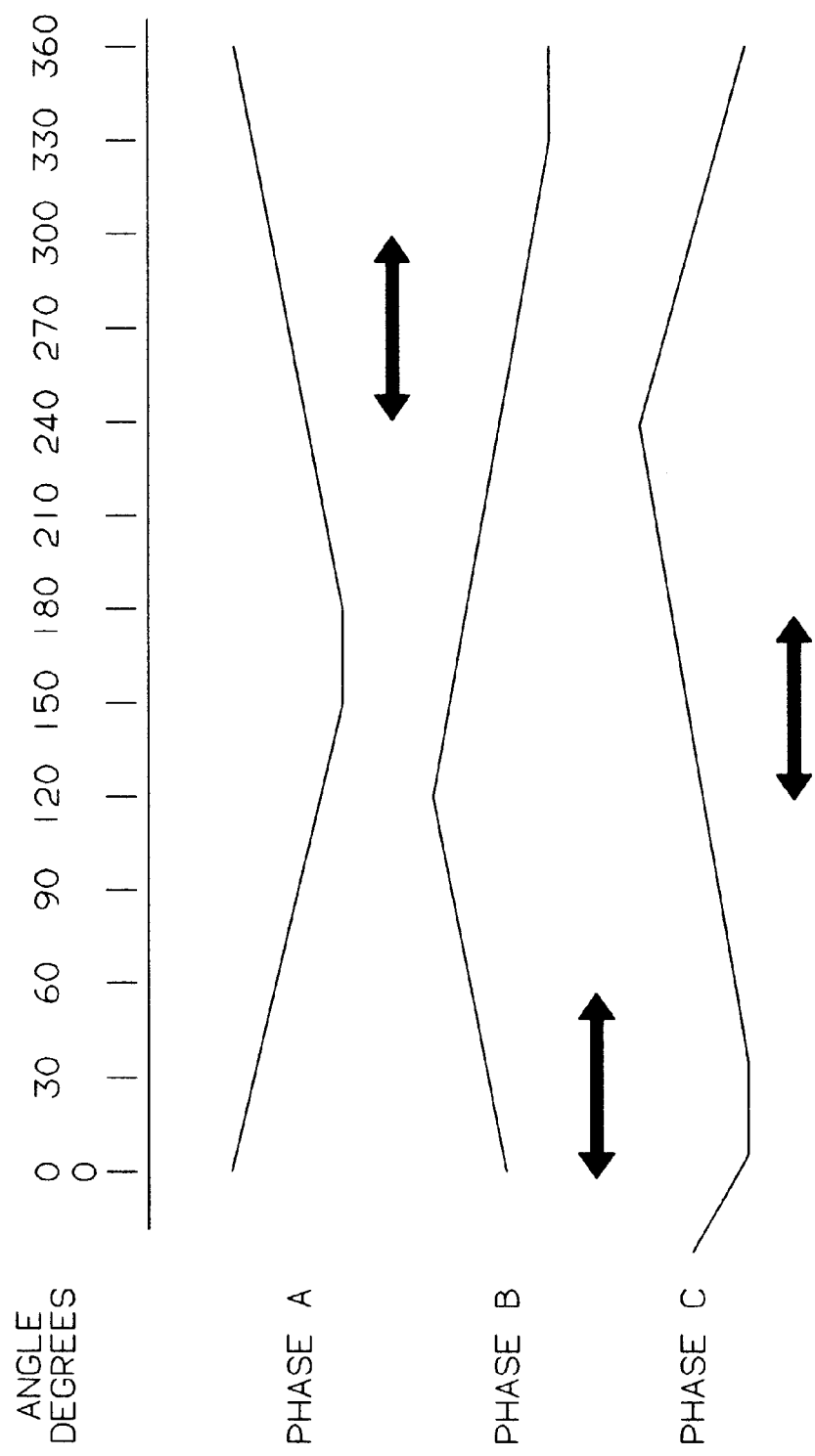
FIG. 4 comprises a series of diagrams illustrating phase inductance profiles as a function of rotor position of a switched reluctance machine.

FIG. 4 illustrates idealized phase inductance profiles as a function of rotor electrical angle for a three-phase switched reluctance machine having phases A, B and C. From the above discussion, it should be evident that the optimum sampling instants for phase B, phase C and phase A are at or near 30 degrees, 150 degrees and 270 degrees, respectively, in the phase A frame of reference.

The sampling noted above can be performed asynchronously (i.e., independent of rotor position) or synchronized with respect to rotor position. It can be shown that as speed increases, for a fixed asynchronous sampling frequency, the probability of obtaining samples close to optimum sampling instants becomes less. Stated another way, the minimum asynchronous sampling rate required to assure that samples are taken near optimum sampling instants is significantly greater than the minimum synchronous sampling rate required to accomplish the same result when the ratio of sampling frequency to electrical frequency is small. For example, as speed increases in a three-phase machine to the point where the ratio of sampling frequency to electrical frequency is three (three samples per electrical cycle) then the probability that samples will occur at the optimum instants is increased when synchronous sampling is used.

Figure 5:
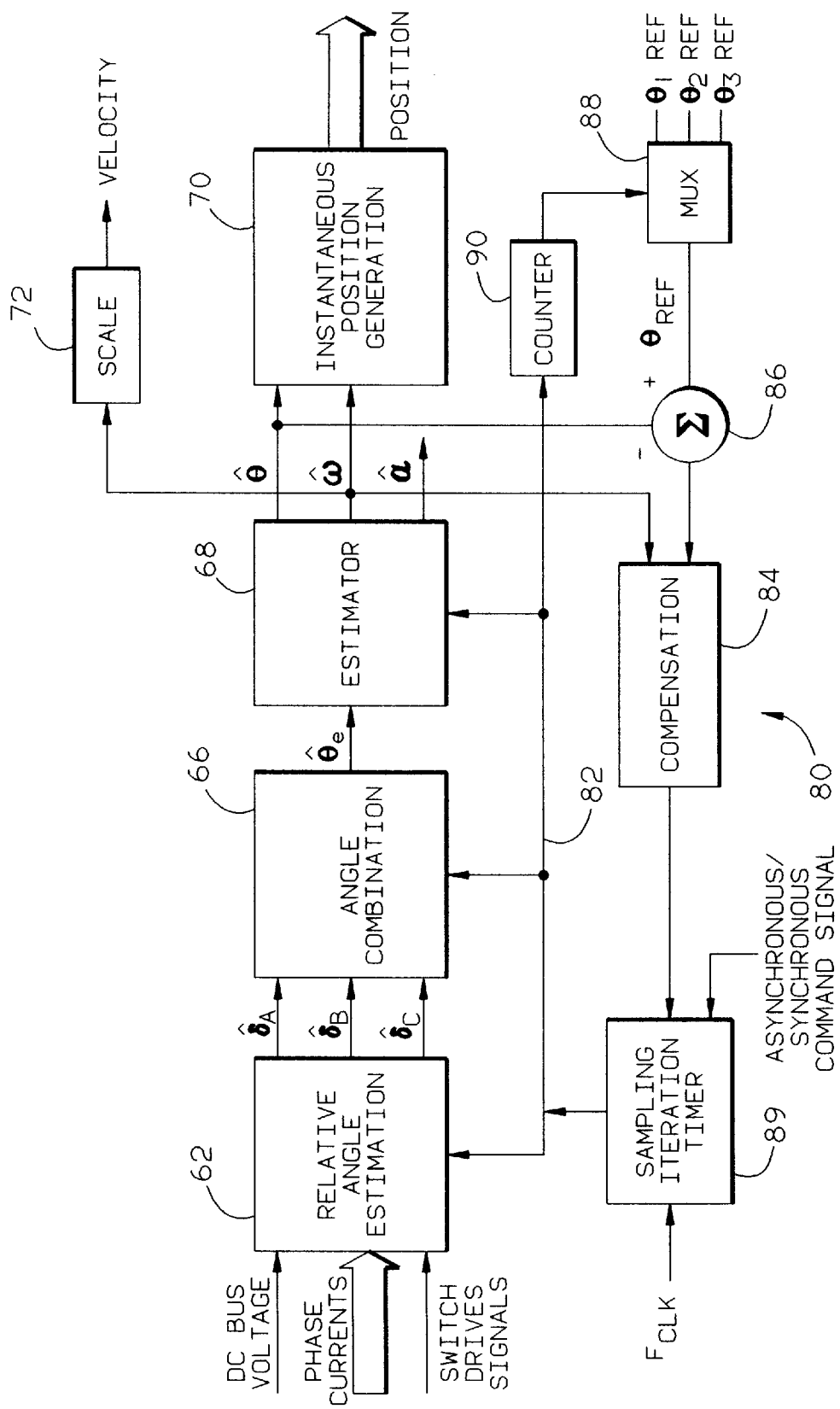
FIG. 5 comprises a block diagram illustrating an apparatus according to the present invention in conjunction with the position estimation subsystem of FIG. 3.

FIG. 5 illustrates the position estimation subsystem 52 of FIG. 3 in greater detail. A relative angle estimation circuit 62 is responsive to the switch drive signals, the DC bus voltage and the phase current magnitudes developed by the inverter 20 and develops a set of output signals $\hat{\delta}_A$, $\hat{\delta}_B$, $\hat{\delta}_C$ on lines 64 each representing an estimate of instantaneous angle from rotor/stator pole alignment for a particular phase of the machine 18. It should be noted that, while three angle estimate signals $\hat{\delta}_A$, $\hat{\delta}_B$, $\hat{\delta}_C$ are developed by the circuit 62 of FIG. 5 wherein each represents the estimated instantaneous angle for the phases of a three-phase switched reluctance machine 18, a different number of signals would be developed on the lines 64 if the machine has a different number of phases, one for each of the machine phases.

Each angle estimate signal $\hat{\delta}_A$, $\hat{\delta}_B$, $\hat{\delta}_C$ represents two possible solutions for estimated rotor position, either phase advanced with respect to (i.e., moving toward) the respective phase pole or phase delayed with respect to (i.e., moving away from) the respective phase pole. This ambiguity is removed by an angle combination circuit 66 which combines the signals $\hat{\delta}_A$, $\hat{\delta}_B$, $\hat{\delta}_C$ to obtain an absolute angle estimate $\hat{\theta}_e$. The angle estimate $\hat{\theta}_e$ is provided to an estimator 68, preferably including a Kalman filter, which improves the estimate of rotor position to obtain a value $\hat{\theta}$. In addition, the estimator 68 develops a velocity estimate $\hat{\omega}$ and further develops an estimated acceleration signal $\alpha$ representing the estimated acceleration of the machine rotor. The acceleration signal $\alpha$ may be used by other circuits (not shown). The signals $\hat{\theta}$ and $\hat{\omega}$ are supplied to an instantaneous position generation circuit 70 which develops a signal that can properly control commutation.

If desired, the estimator 68 may include an implementation other than a Kalman filter.

The signal $\hat{\omega}$ is further supplied to a scaling circuit 72 which in turn develops a velocity estimate signal in the correct units (e.g., rpm's) for the control and protection circuit 54 of FIG. 3.

A synchronization circuit 80 in accordance with the present invention develops a sampling or synchronization signal on a line 82 that in turn controls sampling by the relative angle estimation circuit 62. In addition, the signal on the line 82 may synchronize calculations by the angle combination circuit 66 and the estimator 68. The synchronization circuit 80 may be implemented by hardware, software or a combination of the two and includes a compensation unit 84 having a first input that receives the signal $\hat{\omega}$ developed by the estimator 68. A summer 86 subtracts the signal $\hat{\theta}$ developed by the estimator 68 from a position reference signal $\theta_{ref}$ provided at an output of a multiplexer 88 to obtain a position deviation signal that is supplied to a second input of the compensation unit 84. As noted in greater detail hereinafter, the compensation unit 84 develops a sequence of timer initial values for a sampling timer 89 which, in turn, develops the synchronization signal on the line 82.

Asynchronous sampling must be performed before synchronous sampling can be undertaken so that rotor velocity can be estimated. When operating in an asynchronous mode as commanded by a command signal, the sampling timer 89 outputs a sampling clock signal at a predetermined fixed frequency based upon a signal $f_{CLK}$ developed by a clock and the output of the compensation block 84 is ignored. Thereafter, when operating in synchronous mode under control of a command signal, the sampling timer 89 is responsive to the output of the compensation block 84 rather than the clock signal $f_{CLK}$ to provide velocity synchronization and position synchronization. During velocity synchronization the compensation block 84 provides an output to the sampling timer 89 such that the sampling frequency $f_s$ becomes a predefined integer multiple, k, of the electrical frequency $f_e$ wherein $f_e$ is obtained from the velocity estimate $\hat{\omega}$ converted to electrical Hertz. The minimum value of k is equal to two to avoid aliasing effects, and is preferably, although not necessarily, no less than the number of phases of the machine. Following velocity synchronization, position synchronization is performed in response to the deviation signal developed by the summer 86 to adjust the sampling instants to approach the optimum instants. When k is equal to the number of phases of the machine, then each sample instant can be made to correspond closely to an optimum instant for a particular phase. When k is not equal to the number of phases, then at least one sampling instant, is made to correspond closely to an optimum sampling instant for a particular phase. For example, one sample might be taken at 270 degrees in the phase A frame of reference for a three-phase machine. The remaining k-1 instants will be 360/k degrees apart relative to the first sampling instant. The compensation block 84 includes appropriate gains and signal processing, for example, proportional plus integral control, to ensure that the deviation signal at the output of the summer 86 is small and remains small under transient velocity conditions.

The timer 89 develops sampling signals or pulses on the line 82 which are counted by a counter 90 having a digital output that controls the multiplexer 88. In the illustrated embodiment, the multiplexer 88 includes inputs that receive three reference signals $\theta_{ref1}$, $\theta_{ref2}$ and $\theta_{ref3}$ associated with sampling instants of phases A, B and C, respectively, of the machine 18. The multiplexer 88 passes each of the three input reference signals $\theta_{ref1}$, $\theta_{ref2}$ or $\theta_{ref3}$ to the summer as the signal $\theta_{ref}$ in sequence as the digital value at the output of the counter 90 is incremented. In this regard, it should be noted that the counter 90 counts in a modulo N fashion, where N is the number of phases of the machine (i.e., zero, one, two, zero, one, two, etc . . . or one, two, three, one, two three, etc . . . or any other repetitive sequence of three consecutive values). The reference signal $\theta_{ref}$ causes the summer 86 to develop a position deviation signal which, together with the velocity estimate signal $\hat{\omega}$, causes the compensation unit to develop timer initial values for the timer 89. The timer 89 decrements each initial value to zero, whereupon a pulse is developed on the line 82.

Preferably, the subsystem 52 is implemented by a combination of hardware and software and each pulse developed by the timer 89 causes a new software cycle to be initiated during which the current magnitude flowing in the phase associated with the reference signal currently appearing at the output of the multiplexer 88 is sampled. In the illustrated embodiment, samples of phase current magnitude for phases B, C and A while the machine 18 is operating in the motoring mode are preferably taken at 30 degrees, 150 degrees and 270 degrees, respectively, in the phase A frame of reference. During operation in the generating mode, the samples are preferably taken at sampling instants displaced 180° with respect to samples taken in the motoring mode, i.e., at 90°, 210° and 330° for phases A, B and C, respectively. In addition, calculations are performed by the circuits 62, 66 and/or 68 to obtain the position and velocity estimates during some or all of the software cycles.

It should be noted that, in the event a different number of samples are to be taken per machine electrical cycle, a like number of reference signals will be provided to the multiplexer, each representing a sampling instant for one of the machine phases.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. The details of the structure may be varied substantially without departing from the spirit of the invention, and the exclusive use of all modifications which come within the scope of the appended claims is reserved.

We claim:

1. Apparatus for controlling detection of an operating condition of a rotor of a machine, comprising:

sampling means for sampling the operation condition of the rotor at a sampling instant occurring at a particular time comprising estimating means for obtaining rotor position and rotor velocity estimates at the sampling instant; and synchronizing means coupled to the sampling means for synchronizing the time of the sampling instant to the operating condition, wherein the synchronizing means comprises comparing means for comparing the rotor position estimate against a reference to obtain a deviation signal and timing means responsive to the deviation signal for establishing the time of the sampling instant.

2. Apparatus for controlling detection of position of a switched reluctance machine rotor, comprising:

estimating means for developing estimates of rotor position and rotor velocity at each of a sequence of sampling instants occurring at particular times in response to a series of sampling signals; and synchronizing means coupled to the developing means for synchronizing the times of the sampling instants to the rotor position including means for deriving the sampling signals from the rotor position and velocity estimates, wherein the synchronizing means comprises comparing means for comparing each rotor position estimate against a reference to obtain a deviation signal and timing means responsive to the deviation signal for establishing timing of the sampling signals.

* * * * *